United States Patent [19]

Nikles et al.

[11] Patent Number: 4,605,607

[45] Date of Patent: Aug. 12, 1986

[54] OPTICAL DATA STORAGE MEDIUM HAVING ORGANOMETALLIC CHROMOPHORE/POLYMER COORDINATED INFORMATION LAYER

[75] Inventors: David E. Nikles, Colonia; R. Sidney Jones, Jr., Randolph; James E. Kuder, Fanwood, all of N.J.

[73] Assignee: Celanese Corporation, New York, N.Y.

[21] Appl. No.: 720,633

[22] Filed: Apr. 8, 1985

[51] Int. Cl.[4] .................... G03C 1/72; G03F 7/26
[52] U.S. Cl. ........................... 430/17; 8/647; 430/19; 430/270; 430/321; 430/322; 430/338; 430/945; 430/964
[58] Field of Search ............. 430/19, 270, 321, 322, 430/338, 495, 945, 964, 17; 346/135.1, 76 L; 8/552, 553, 647, 661, 686

[56] References Cited

U.S. PATENT DOCUMENTS

| | | | |
|---|---|---|---|
| 3,637,581 | 1/1972 | Horiguchi et al. | 8/450 |
| 4,458,004 | 7/1984 | Tanikawa | 430/536 |
| 4,478,782 | 10/1984 | Kuder et al. | 430/945 |
| 4,492,750 | 1/1985 | Law et al. | 430/945 |

Primary Examiner—Richard L. Schilling
Attorney, Agent, or Firm—Burns, Doane, Swecker & Mathis

[57] ABSTRACT

Provided is an optical data storage medium comprising a chromophore/polymer composition information layer, wherein the chromophore is chemically bound or coordinated with the polymer. The chromophore is an organo macrocyclic chromophore containing a constituent metal atom, and preferably a central metal atom, with the chromophore being coordinated to the polymer through the metal atom. As a result, the chromophore/polymer material has excellent film-forming properties so that the medium can be readily and efficiently manufactured. As well, the resulting information layer offers excellent thermomechanical properties and exhibits excellent absorption properties, all in a single component material. By utilizing a single component material, the problem of dye/polymer phase separation frequently encountered in conventional dye/polymer mixtures is also overcome.

33 Claims, No Drawings

OPTICAL DATA STORAGE MEDIUM HAVING ORGANOMETALLIC CHROMOPHORE/POLYMER COORDINATED INFORMATION LAYER

BACKGROUND OF THE INVENTION

1. Field of the Invention:

This invention relates to a novel optical information recording medium and the recording of information thereon. More particularly, the present invention relates to an information recording medium, preferably in the form of a disk or in a tape format, suitable for use with optical recording and playback apparatus, with the information layer of the recording medium comprising a chromophore/polymer composition. In particular, the chromophore is an organo macrocyclic compound having a central metal atom, which chromophore is coordinated to the polymer through the central metal atom.

2. Description of the Prior Art:

Optical recording methods in which light from a laser is focused upon the surface of a recording medium with sufficient intensity to cause a detectable change in the physical characteristics of the surface material have been proposed. Among these methods is the establishment of an information pattern of pits. In such methods, the information representative pattern of pits may be formed in the surface of the recording medium by suitably controlling the intensity of the focused light in accordance with the information to be recorded while relative motion is established between the recording medium and the focused light spot.

For instance, in recent years, attention has been increasingly paid to the information recording method in which information is written in a thin film of metal or the like formed on a substrate by using a laser ray or beam. According to such a method, the recording of information has been accomplished by forming holes or recesses in the metallic thin film under the action of an energy beam such as a laser ray. See, e.g., U.S. Pat. No. 4,238,803.

The recording medium, of course, is one of the key elements in any optical information storage system. The commercial viability of the recording medium depends upon such technical parameters as the sharpness in recording and playback of the information, i.e., a high signal to noise ratio. Dyes and pigments have accordingly been employed in information layers, often to enhance the sensitivity of the recording layers at the particular wavelength of the laser being used, which results in a much sharper recording and playback of information.

For example, Spong, U.S. Pat. No. 4,097,895, describes a recording medium which comprises a light reflecting material, such as aluminum or gold, coated with a dye-containing light absorbing layer, such as fluorescein, which is operative with an argon laser light source. The thickness of the light absorbing layer is chosen so that the structure has minimum reflectivity. An incident light beam then ablates, vaporizes or melts the dye-containing light absorbing layer, leaving a hole and exposing the light reflecting layer. After recording at the wavelength of the recording light, maximum contrast between the minimum reflectance of the light absorbing layer and the reflectance of the light reflecting layer exists.

Carlson, in U.S. Pat. No. 3,475,760, discloses a system for directly recording information in a thermoplastic film as a deformation by using a high energy laser scanning beam of small diameter. It is further disclosed that the sensitivity of the films for laser film deformation recording can be enhanced by the addition of pigments or dyes which exhibit a high absorption at the laser wavelength. Erasure of the film deformation is accomplished by recording over the information to be erased using a similar laser beam but with a much smaller scan line spacing, preferably so as to provide overlap of the scan lines.

Other U.S. patents which disclose the use of a light absorbing dye in the recording layer include U.S. Pat. Nos. 4,412,231 and 4,446,223. The former patent discloses using a mixture of dyes having different light absorbing wavelengths so that the resulting recording layer has a light absorptivity of 80% or more at all the wavelengths in the range of from 400–900 nm. The latter patent discloses an optical information recording element comprising a support coated with a layer of an amorphous composition, which composition comprises a binder and an oxoindolizine or oxoindolizinium dye.

In a paper entitled "Single Wavelength Optical Recording in Pure, Solvent Coated Infrared Dye Layers" by Gravesteijn, Steenbergen and van der Veen, experiments on the use of certain dyes for optical recording for digital and video applications at GaAlAs laser wavelengths are reported. The paper was presented at the Proceeding of the SPIE, "Optical Storage Media", volume 420, June 6–10, 1983. The specific dyes discussed in the paper are squarylium dyes and pentamethine dyes. It is further suggested that solubility in organic solvents can be greatly increased by the introduction of t-butyl groups into thiapyrylium end groups.

The use of dyes in conjunction with optical recording media comprising a styrene oligomer is disclosed in the article by Kuroiwa et al appearing in the *Japanese Journal of Applied Physics*, Vol. 22, No. 2, February, 1983, pp. 340–343. Among the dyes and pigments discussed as being useful is a copper phthalocyanine pigment. Phase separation and incompatibility between the dyes and oligomers are noted in the article as being problems in the use of dyes for optical information media.

The use of other metal phthalocyanine dyes in optical recording media is disclosed, for example, in U.S. Pat. No. 4,458,004. Note also, U.S. Pat. No. 4,492,750, which discloses the use of specific naphthalocyanine compounds in optical recording media. The film-coating properties of such dye materials, however, have been generally found to be poor, the read out Signal/Noise (S/N) ratio poor and tending to fluctuate depending on the particular portion of the layer, and the S/N ratio of the read-out deteriorating significantly after repeated irradiations of the read-out light.

Horiguchi et al, U.S. Pat. No. 3,637,581, discloses chromogen-bonded polymers, with the chromogen possibly being a metal phthalocyanine. The suitability and use of such products in optical mass data storage applications, however, are not disclosed therein.

Thus, while dyes or pigments have been employed in the information storage layers of optical recording media due to their excellent absorption properties, problems are encountered with regard to the application of the dyes or pigments as a stable layer. The addition of dyes to film-forming polymers due to limited solubility of the dye in the polymer and the tendency of the dye/polymer mixture to phase separate over time, as noted above, are severe problems which need to be overcome. Indeed, the higher the pigment or dye concentration, the more likely such problems are encountered. Yet, it is desired to increase the dye concentration in the information layer so as to increase the sensitivity of the medium, the recording rate possible and the S/N ratio upon read-out.

The search for an improved information storage medium comprising a dye or pigment overcoming the aforementioned problems is thereby continuously ongoing. What is desired is a recording layer material which of course exhibits a high extinction coefficient, but which also exhibits excellent film-forming properties to enhance its coating applicability, and good solubility in solvents for ease of manipulation. With such properties, the commercial viability and exploitation would be greatly enhanced. Otherwise, mass production would be too difficult to render the medium commercially plausible on a large scale. A recording medium which further eliminates the problem of phase separation over time would also be most desirable. Excellent stability with respect to thermal, actinic and oxidative degradation is also a desirable feature.

Accordingly, it is a major object of the present invention to provide a novel and improved recording medium which comprises a chromophore in the information layer.

It is yet another object of the present invention to provide a novel optical recording medium which allows for ready application of the chromophore layer to form a stable information layer, while still exhibiting excellent absorption properties.

Still another object of the present invention is to provide a novel recording medium which contains a chromophore in the information layer, yet for which the problem of phase separation over time frequently encountered in dye/polymer mixtures is eliminated.

Yet another object of the present invention is to provide a one-component material for use in an information layer of an optical recording medium which exhibits excellent film-forming and thermomechanical properties, and excellent absorption properties.

These and other objects, as well as the scope, nature and utilization of the invention, will be apparent to those skilled in the art from the following description and the appended claims.

SUMMARY OF THE INVENTION

In accordance with the foregoing objectives, provided hereby is a medium for storage of optical information, i.e., information recorded and played by optical means, which medium comprises a chromophore/polymer composition wherein the chromophore is chemically coordinated with the polymer. The chromophore is an organo macrocyclic chromophore containing a constitutent metal atom, preferably being a central metal atom, through which the chromophore is chemically coordinated to the polymer.

The most preferred chromophores for use in the present invention are aza-annulenes, e.g., phthalocyanines, naphthalocyanines, porphyrins, substituted porphyrins, tetrabenzoporphyrins, and tetranaphthaloporphyrins. The preferred constituent metals are Ge, Sn, Al, Ga, In, alkaline earths, lanthanides, actinides or transition metals. It is most preferred that the constituent metal be a central metal atom with the most preferred central metals being the transition metals. The preferred polymer to which the chromophore is chemically coordinated is a dimer acid polyamide or poly(vinylpyridine).

In a most preferred embodiment, the medium for storage of optical information is in the form of a disk. Furthermore, the medium is erasable.

In another embodiment of the present invention, there is provided a method of recording information in a thin film deposited on a relatively thick substrate by irradiating the film with a laser beam in accordance with said information to form pits in the film, the improvement which comprises said film being comprised of a chromophore/polymer composition wherein the chromophore is an organo macrocyclic chromophore containing a constituent metal atom, and preferably a central metal atom, with the chromophore being chemically coordinated to the polymer through the central metal atom.

In another embodiment there is provided by the present invention a readable information medium comprising a relatively thick and thermally stable substrate having coated thereon a layer comprising an information track comprised of a chromophore/polymer composition. The chromophore of the composition is an organo macrocyclic chromophore containing a constituent metal atom, and preferably a central metal atom, with the chromophore being chemically coordinated to the polymer through the central metal atom.

DETAILED DESCRIPTION OF THE PREFERRED EMBODIMENTS

The recording or information layer of the optical data storage medium of the present invention comprises the chromophore/polymer composition. The chromophore is chemically coordinated to the polymer so that the composition is essentially a one-component system.

The chromophore is an organo macrocyclic chromophore containing a constituent metal atom. Examples of suitable chromophores for the present invention include aza-annulenes, bis dithiolates. The metal dye complexes as disclosed in *The Chemistry of Synthetic Dyes,* by V. Venkataraman, Vol. I, 1952, Chapter XIV, pp. 551 et seq. An example of a non-symmetrical chromophore complexing with a polymer to form a chromophore/polymer composition in regard to the present invention is a composition of the following units:

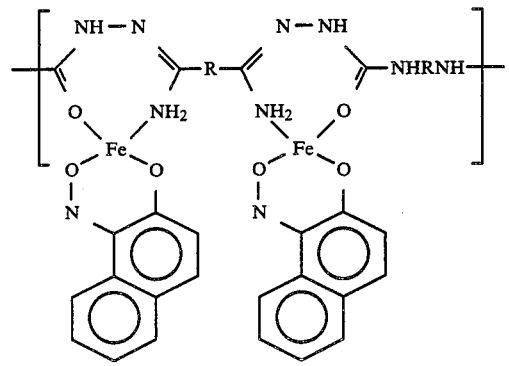

wherein R is a direct chemical bond, aliphatic radical having from 2 to 12 carbon atoms, an alkylene of 3 to 10 carbon atoms or aryl. In general, any chromophoric compound with a constituent metal atom, and preferably a central metal atom through which coordinate bonding can occur with the selected polymer can be utilized for the present invention.

Substitution of the chromophores can be to any extent practicable, the determining factor being the ultimate performance of the chromophore/polymer material as the recording layer in an optical recording medium. Generally, when substitutions are employed, the number and type of substitutions are chosen so that the absorption maximum for the material corresponds with the output wavelength of the laser used in the optical recording. The thermomechanical properties of the material should also allow data to be recorded on the recording layer by a focused laser beam operating above a threshold power value for writing data and at a useful data rate. The data can then be read by a focused, but lower power, laser beam that causes no detrimental change in the signal obtained from the recording layer. The excellent absorption characteristics of the recording layer material allow the data to be read by changes in reflectivity. The thermomechanical properties of the chromophore/polymer composition material can also be effected by the number (and type) of substitutions to allow laser addressed erasure of the data and to allow a film of the material to be cast by any technique known to those skilled in the art of coating. In general, therefore, when substituents are employed, the effect of the substituents of the chromophore should be carefully considered so that they are selected to achieve the desired spectroscopic, thermomechanical and film-forming properties.

The constituent metal atom of the chromophore can be any metal through which coordinate bonding with the polymer can occur. In general, however, it is preferred that the metal atom be Ge, Sn, a transition metal, Al, Ga, In, an alkaline earth, lanthanide, or actinide. It is most preferred for purposes of the present invention that the metal atom be a central metal atom, in which case the transition metals are most preferred. Non-symmetrical chromophore compounds wherein the metal atom is not central, as noted previously, are contemplated within the scope of the present invention.

The preferred organo macrocyclic chromophore for the purposes of the present invention is an aza-annulene containing a central metal atom. The preferred aza-annulene chromophores are phthalocyanines, naphthalocyanines, tetrabenzoporphyrins or substituted or unsubstituted porphyrins. The naphthalocyanines are preferred for use with systems employing a diode laser, i.e., wavelength from 750-900 nm. Whereas the phthalocyanines are preferred when the system laser is a He-Ne laser, i.e., wavelength about 633 nm, tetrabenzoporphyrins when the laser wavelength is about 488 nm, i.e., an Argon laser, and porphyrins when a frequency-doubled diode laser is used, wavelength about 410 nm. Thus, the preferred chromophore materials in any particular instance is that absorbing sufficiently at the wavelength of the laser used in the write/read system to be employed.

The macrocyclic portion of the chromophore, as discussed above, can also be substituted with various substituents, preferably selected to influence the absorption spectrum of the recording layer. The substituents may be chosen such that the absorption maximum of the recording layer closely corresponds to the wavelength of light used in the recording, erasing, and in most cases, the reading processes. These substituents may also contribute to the ability of the material to be film forming.

The most preferred aza-annulenes for use with a diode laser are the naphthalocyanines having the following structural formula with any isomers thereof being contemplated for the purposes of the present invention:

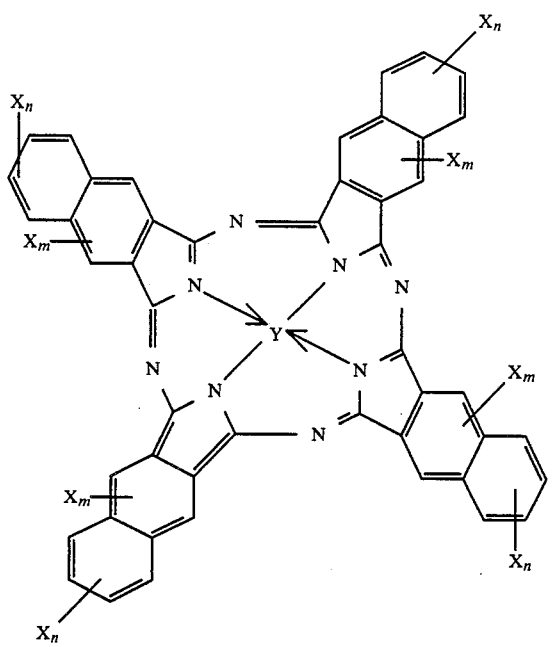

wherein the X substituents are independently selected organic or inorganic substituents and can be the same or different, with n and m indicating the number of independently selected X substituents, each n being the same or different and ranging from 0 to 4, and each m being the same or different and ranging from 0 to 2. The substituents X in particular can be alkyl, halo, hydroxy or any other conventional substituent for such chromophores. As discussed previously, however, the number and type of X substituents, when employed, are generally selected to effect the absorption and thermomechanical properties of the final recording layer. Y is the central metal atom.

The polymer to which the chromophore is coordinated is preferably a polymer having good film-forming and thermochemical properties so that it can be effectively employed in an optical information medium, and which has a suitable site for chemical coordination to the constituent metal atom of the chromophore. Of course, if the chosen polymer does not have a suitable reactive site for coordination with the metal of the chromophore, reactive moieties can generally be reacted with the polymer to provide a product having suitable pendant reactive moities.

In general it has been found most desirable to employ polymers having reactive heterocyclic amine moieties or certain ionic moieties which may either be incorporated into the backbone of the polymer or attached to the polymer as pendant groups. Particularly effective heterocyclic amine moieties include imidazolines, pyridines and imidazoles. Preferred ionic moieties include thiolates and carboxylates.

Examples of suitable polymers are the dimer acid polyamides, polyamides, poly(vinylpyridine), polyurethanes, polyesters, silicones and vinyl polymers such as styrene polymers. The preferred polymers are dimer acid polyamides and poly(vinylpyridine). Of particular preference are the dimer acid polyamides Emerez 1565 and Emerez 1514, e.g., as disclosed in U.S. Pat. No.

4,478,782, which is hereby expressly incorporated by reference.

Once the polymer has been synthesized, it can be reacted directly with the chromophore by conventional reaction procedures to yield the one-component composition. Generally, the reaction is controlled so that the amount of chromophore incorporated into the polymer comprises less than 25% by weight of the material. Functionally, of course, the lower limit of the amount of the chromophore incorporated is determined by the suitable optical absorption properties of the material. The upper limit of the amount of chromophore incorporated is determined by the desired thermomechanical properties exhibited by the material.

The chromophore/polymer material of the subject invention allows one to realize the excellent absorption properties of the chromophore, e.g., high extinction coefficient, while also realizing the benefits of the thermomechanical properties of a film-forming material as a result of the film-forming properties arising from the polymeric base. As well, since a single component material is used, the problem of dye/polymer phase separation is avoided. Chemically coordinating the chromophore to the polmer also allows much higher effective chromophore concentrations in the recording layer than simple solutioning of a dye in a polymer. The result is increased sensitivity so data recording is possible with lower laser power at faster speeds.

Coordination through the constituent metal atom has also been discovered to be surprisingly advantageous with regard to the marking properties of the composition. During laser recording, the relatively weak metal-polymer bond breaks, thereby lowering the viscosity of the material. Upon cooling, however, the bond reforms and the morphology of the polymer is again set for the chromophore. The practical result of this phenomenon is more control over writing and erasing of information as one has a very sharp threshold, i.e., difference between power needed for writing and not writing. Moreover, in the bonded state after writing, the composition exhibits good stability against creep and pit deformation. Therefore, the archival life is good. Overall the result is an information layer exhibiting an excellent combination of absorption and thermomechanical properties permitting one to easily mark and maintain an information record, while also allowing one to easily apply the material as a film in manufacturing the optical medium.

The film formed by the chromophore/polymer material of the present invention may be self-supporting, in which case any suitable or conventional casting technique may be used. Generally, however, it is preferred to cast the material as a film on a suitable support to add dimensional stability and support thereto. As well, the film may not always be self-supporting. The substrate may be optically featureless or may contain preformatting information (e.g., tracking groove and/or encoded information in the form of readable marks.) It is important when coating a substrate, of course, that an extremely flat homogeneous information recording surface be obtained to preclude the scattering of light.

Any suitable coating technique may be used to achieve such a flat surface, with a conventional technique such as spin coating, which allows for a high degree of control of film thickness and flatness, being preferred. It is, of course, desired and preferred that the one-component material form a thin film coating.

The substrate which is coated with the chromophore/polymer material should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such a smoothing or subbing layer should not, of course, interfere with application or utilization of the recording layer which is subsequently applied thereto. The subbing layer can contain preformatting information.

The material of which the substrate is comprised is generally a material exhibiting good structural integrity against warping and mechanical strength. Examples of suitable materials include aluminum, glass, reinforced glass, ceramics, polymethacrylates, polyacrylates, polycarbonates, phenolic resins, epoxy resins, polyesters, polyimides, polyether sulfones, polyether ketones, polyolefins, polyphenylene sulfide and nylon. Furthermore, the shape and size of the substrate, and hence the recording medium, can vary depending on the application. The shape and format, for example, may be a disk, tape, belt or drum. A disk shape or tape format is most preferred.

The structure of the recording medium itself may also vary in that the recording layer may be coated on one side or both sides of the substrate. Or, two substrates having the recording layer on either side can be combined allowing the sides having the recording layers to face each other at a constant distance, the combined substrates being sealed to prevent dust contamination and scratches.

The medium of this invention may also have an undercoating layer such as a metal reflective layer or layer of various resins on the substrate if necessary, with the recording layer being coated over it. In addition, various thermoplastic resins, thermosetting resins, UV or electron beam cured resins, may be used as an undercoating material. Furthermore, it is possible to laminate layers from the substrate as follows: a reflective layer, undercoating layer and recording layer. The film thickness of the recording layer may be designed to be nonreflective if desired.

In addition, guiding grooves may be installed on the substrate, and the recording layer may be installed on the extruded portions and/or intruded portions of the grooves. Furthermore, if necessary, a reflective layer or opaque layer may be installed over the recording layer.

A suitable protective layer or cover, such as those known to the art, can also be used if desired to protect the recording layer from dirt, dust, scratches or abrasion.

In addition to the chromophore/polymer composition, the recording layer may also contain other polymers or oligomers, various plasticizers, surfactants, antistatic agents, smoothening agents, flame retardants, stabilizers, dispersants, leveling agents, antibleeding agents, antioxidants, water repellents, emulsifiers, etc. as may be desired. The effect the presence of such additives may have on the optioal properties of the medium, however, should be taken into account.

In an illustrative recording system embodying the principles of the present invention, a record blank disk form may be subject to rotation at a constant linear or constant angular velocity while a beam of light from a light source, e.g., a laser, is focused on the information surface of the disk. The wavelength of the light being compatible with the absorption characteristics of the chromophore/polymer composition of which the recording layer is comprised. The intensity of the light beam is controlled in accordance with the information to be recorded. Illustratively, the control is effected in accordance with carrier waves modulated in frequency by information containing signals, with the light beam intensity varying as a result between a high level sufficient to effect a detectable change in the physical characteristics of the absorptive one-component recording layer material and a low level insufficient to effect such a detectable change, the frequency of the level alternations varying as the signal amplitude changes. Preferred writing speeds are in the range of from $10_6$ to $10_7$ bits per second.

The relative diameter and depth of the holes or pits formed will, of course, depend not only on the optical and thermal properties of the one-component information layer, but also on the characteristics of the writing beam, i.e., focused spot diameter, depth of focus, intensity profile and intensity and duration of the writing pulse. Optimization of these parameters is familiar to those skilled in the art.

As a result of the pit-formation in the recording layer material, an information track comprising a succession of spaced pits is formed in the information surface of the disk, the pits appearing in those surface regions exposed to the high intensity beam. Variations in the length and separation of the pits are representative of the recorded information.

The result of the above-described recording process is the formation of an information record of a form which facilitates recovery of the recorded information by optical playback processes. The information track of such an information record comprises (1) undisturbed surface regions alternating with (2) pit regions formed by the pit-forming process, preferably coated on a substrate. This information track can be in either analog or digital form, for example, audio, video or computer data.

In playback or read operations pursuant to the principles of the present invention, a light beam is focused upon the information track of an information record. The playback beam has a constant intensity at a level insufficient to effect pit formation in the information layer or erasure of the recorded information by levelling. A photodetector, positioned to receive light reflected from the successive regions of the information track as they pass through the path of the focused light, develops a signal representative of the recorded information.

Several variations in the playback or reading system as known to the art are possible. The most preferred mode of reading information involves the relative reflection between the one-component material surface and those areas in which pits have been formed in the recordation of information. When the reflectivity of the one-component material surface is of relatively high reflectivity as compared to that of the substrate or other underlying layers, the reflectivity in the areas of the pits will be less than in the regions without pits when a beam from the read laser passes thereby Thus, a written bit can be registered as a decrease in reflected intensity. When the relative reflectivity of the one-component material surface is low as compared to that of the substrate and other underlying layers, however, the reflectivity in the areas of the pits will be more than in the regions without pits when a beam from the read laser is focused thereon. Accordingly, a written bit can be registered as an increase in reflected intensity.

An advantage of the present invention is that the resulting information medium can also be suitable for erasure. The selection of polymer and substituents on any particular chromophore will have a profound effect on the erasability of the medium. Generally, complete and accurate erasure of recorded information can be readily carried out by heating the medium to a sufficiently high temperature such that the chromophore/polymer one-component material becomes softened sufficiently to allow levelling of the surface. This can be done globally by heating the entire disk in an oven or some other suitable heating means, or by means of a defocused laser beam whose intensity at the surface of the information layer is intermediate between that of the write beam and read beam. It is generally necessary to heat an area greater than that of a single bit (typically 1 $\mu$m in diameter).

The present invention is further illustrated by the following examples. The details of the following examples, however, are in no way meant to be limitative, but rather merely illustrative.

The following examples pertain to the preparation of chromophore/polymer compositions useful in optical data storage media in accordance with the present invention. The chromophore employed in each example is ruthenium phthalocyanine or vanadyl phthalocyanine and the polymer base a poly(vinyl pyridine) or dimer acid polyamide. The procedures exemplified, however, would be workable for other metal containing organic macrocylic compounds, particularly metal phthalocyanines, naphthalocyanines and tetrabenzoporphyrins. Other polymers than the poly(vinyl pyridine) and dimer acid polyamides exemplified should also be readily substituted by the skilled artisan.

The first two examples simply demonstrate the chemical coordination of a transition metal phthalocyanine chromophore to a suitable polymer.

EXAMPLE 1

0.0116 g of ruthenium phthalocyanine was mixed with 0.2295 g of poly(4-vinylpyridine). 2.9304 g of n-butanol and 1.7 g of 1,2 dichloroethane were added to the mixture. The polymer did not dissolve in the solution, but the ruthenium phthalocyanine did dissolve to give a deep blue solution. Upon sonication (i.e., subjecting the mixture to ultrasonic irradiation), the polymer seemed to swell and turn blue as the chromophore became coordinated to the 4-vinyl pyridyl residues of the polymer structure. The mixture was allowed to stand for about ½ hour and then the blue butanol solution was decanted from the deep-blue polymer. The polymer was then washed three times with 2 ml of fresh n-butanol to remove excess ruthenium phthalocyanine. After the third washing the butanol was colorless, while the poly(4-vinylpyridine) was still a deep-blue color. This indicated that the chromophore was at least sufficiently coordinated with the polymer to not be extracted by the n-butanol.

EXAMPLE 2

0.1141 g of poly(4-vinylpyridine) was dissolved in 12.4049 g of toluene with sonication. A small amount, i.e., about 25 to 50 mg, of ruthenium phthalocyanine was added to the colorless solution. The ruthenium phthalocyanine chromophore was not soluble in the toluene and settled to the bottom of the solution. Upon sonication, however, small amounts of the chromophore appeared to dissolve in solution as the solution turned blue. After continued sonication all the ruthenium phthalocyanine became dissolved in the solution and wa believed to be held in solution through coordination to the poly(4-vinylpyridine). Addition of about 2 ml of water caused some of the polymer to precipitate from the toluene and settle at the interface between the toluene (top phase) and the water (bottom phase). Some polymer remained in the toluene solution as indicated by the blue top phase, which is the result of the ruthenium phthalocyanine/poly(4-vinylpyridine) coordination. The water phase remained colorless.

The next two examples demonstrate the preparation of transition metal phthalocyanines/dimer acid polyamide compositions. The phthalocyanine is coordinated to the polymer through its central metal atom and the imidazolidine functional moiety of the polymer.

EXAMPLE 3

About 30 mg of Emerez ®-1565 (a dimer acid polyamide available from Emery Industries) was dissolved in 3 ml of a saturated solution of a ruthenium phthalocyanine in n-butanol. The mixture resulted in a deep blue solution. About 1 ml of distilled water was then added to the butanol solution, with a slimy white material phase thereby becoming separated as a water phase. The butanol and water phases were immiscible, with the butanol forming a top blue phase. The mixture was allowed to sit overnight, with no further separation occurring.

EXAMPLE 4

In this example, N,N-dimethylformamide was utilized as a solvent as opposed to the n-butanol in Example 3.

A small piece, about 20 mg, of Emerez ®-1565 was placed in a saturated solution of ruthenium phthalocyanine in N,N-dimethylformamide. The mixture was sonicated for about one minute. The polymer did not appreciably dissolve. Close visual examination of the polymer indicated some blue color, indicating possible reaction with the ruthenium phthalocyanine. The mixture was allowed to stand overnight.

The next day the solution was decanted off with a disposable pipette and the polymer was rinsed with two 2 ml portions of N,N-dimethylformamide to remove excess ruthenium phthalocyanine. The polymer was a deep blue color that persisted after repeated washings with the N,N-dimethylformamide, thereby indicating coordination of the chromophore to the polymer in accordance with the subject invention.

EXAMPLE 5

0.446 g of Emerez ®-1565 polymer was dissolved in 1.3953 g of n-butanol solvent after stirring and heating to about 100° C. Upon allowing the solution to cool to about 50° C., 0.4705 g vanadyl phthalocyanine was added to the viscous polymer solution. The mixture was agitated by hand, sonicated for about 30 seconds, and then allowed to stir overnight at room temperature. The solution was a deep purple.

The next day the solution was an opaque-black color which was taken up in a gas tight syringe and filtered through a 13 mm diameter 5 μm pore size millipore filter. About ½ ml of a dark brown solution was filtered, which color change indicated the reaction between the vanadium phthalocyanine and Emerez ®-1565 dimer acid polyamide.

The foregoing run was repeated on a larger scale. 3.2 g of Emerez ®-1565 polymer was completely dissolved in 47.81 g of n-butanol upon stirring and heating to about 100° C. 2.813 g of vanadium phthalocyanine was then added to the solution. The result was a deep purple slurry which was allowed to stir at 90° C. for about three days. The mixture was then allowed to cool to room temperature, and filtered through a 1.2 μm millipore filter using a pressure filter. The filtrate was a khaki color, which a considerable amount of purple powder was retained on the filter.

The filtrate was concentrated to a viscous mass that was mechanically removed from the round bottom flask. The last traces were rinsed out with some n-butanol. The butanol was further removed by heating to about 150° C. on a watchglass to give a khaki green molten polymer solution. The material was allowed to cool on the watchglass to a solid film and then dried at high vacuum overnight at 60° C.

Samples of the vanadyl phthalocyanine/dimer acid polyamide composition were tested by DSC-TMA, IR spectra, and Electronic Absorption Spectra techniques. The results from the IR spectra were not informative. The results of the DSC-TMA and Electronic Absorption Spectra tests are as follows:

Twenty-three percent (by weight) of vanadyl phthalocyanine was coordinated in the polymer. The thermal properties of the composition indicated two thermal transitions:

DSC: T(melt,1) 48° C.; T(melt,2) 83° C.
TMA: T(soften,1)=50° C.; T(soften,2)=84° C.
The polymer without any vanadyl phthalocyanine had the thermal properties:
T(melt)=54° C.; T(soften)=52° C.
This indicated that the reaction of the chromophore with the coordinating polymer changed the physical properties of the material.

The Electronic absorption spectrum was taken in n-butanol, and it showed two absorption maxima:
(i) a strong absorption at 685 nm, and
(ii) a weaker absorption at 800 nm.
Thus, the dye loading of the foregoing polymer composition is quite high. Moreover, the chromophore/polymer composition is quite homogeneous. Its high solubility in organic solvents such as n-butanol also facilitates its coating and subsequent film-forming by such conventional techniques as spin coating.

EXAMPLE 6

In the example, a dimer acid polyamide useful for coordination purposes of the present invention was synthesized. Then, hypothetically, coordinated with a dye and spin coated onto a suitable substrate for use as an optical mass data storage medium.

Step A: Preparation of the coordinating monomer N-[2(4-pyridyl)-ethyl]ethylene diamine.

This was an adaptation of the procedure reported by R. G. Lacoste and A. E. Martel in *Inorganic Chemistry* 1964, 3(6), 881, for the preparation of N-[2-(4-pyridyl-ethyl]ethylene diamine. To a 250 ml three neck round bottom flask, fitted with a dropping funnel, a reflux condenser, and magnetic stirring, was added 12.02 g (0.2 mol) ethylene diamine, 24 g distilled water, and 31.50 g (0.3 mol) freshly distilled 4-vinylpyridine. The temperature was maintained at 20°-30° C. while 12.0 g glacial acetic was added through the dropping funnel. After all the acetic acid was added, the reaction mixture was heated on the steam bath for two hours. The product was fractionally distilled to give 11.48 g (35% yield). The product was characterized by IR and NMR.

Step B: Preparation of the dimer acid polyamide polymer.

To a 500 ml three neck round bottom flask, fitted with mechanical stirring, a Dean-Stark moisture receiver and reflux condenser, and dry $N_2$ purge, was added 102.24 g (0.18 mol) Empol-1010 (dimer acid purchased from Emery Industries, Cincinnati, Ohio), 8.87 g (0.148 mol) ethylene diamine, and 5.95 g (36 mmol) N-[2-(4-pyridyl)-ethyl]ethylene diamine. The mixture was slowly heated with stirring under $N_2$ to 250° C. over the period of two hours and then held at 250° C. for an additional two hours. After two hours at 250° C., the reaction mixture was distilled under high vacuum at 250° C. for 2.5 hours to remove (7.6 g) water (and other volitiles) formed during the condensation polymerization. This gave 109 g of a coordinating dimer acid polyamide which was shown by NMR to contain one pyridine residue per every 12 dimer acid residues.

Step C: Coordination with chromophore and spin coating.

The polymer (4.0 g), made in step B, is dissolved in 16.0 g n-butanol with stirring and gentle heating (T<100° C.). After all the polymer has dissolved, 0.75 g of Oleosol Fast Blue (a copper phthalocyanine dye available from Sumitomo Chemicals) is added to the stirring polymer solution. The blue solution is allowed to stir at room temperature overnight. It is assumed that all the dye goes into solution and coordinates with the polymer. The next day the solution is filtered through a 0.5 micron pore size Millipore membrane filter to remove any insoluble materials. The solution is then cast on glass or polymer (polymethyl methacrylate or polycarbonate) substrates using a spin coater, e.g., a Headway model EC101D spin coater. The films are then thoroughly dried in a vacuum oven at 60° C. for two hours to remove any residual solvent.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A medium for storage of optical information comprising a polymeric information layer, the improvement which comprises said polymeric information layer comprising an organo macrocyclic chromophore containing a constituent metal atom, with the chromophore being chemically coordinated to the polymer through the constituent metal atom.

2. The medium of claim 1, wherein the polymer is a dimer acid polyamide.

3. The medium of claim 1, wherein the polymer is poly(vinylpyridine).

4. The medium of claim 1, wherein the medium is in the form of a disk.

5. The medium of claim 1, wherein the medium is in tape format.

6. The medium of claim 1, wherein the organo macrocyclic chromophore is an aza-annulene.

7. The medium of claim 1, wherein the organo macrocyclic chromophore is a phthalocyanine, naphthalocyanine, porphyrin or tetrabenzoporphyrin.

8. The medium of claim 1, wherein the constituent metal atom is Ge, Sn, a transition metal, Al, Ga, In, an alkaline earth metal, lanthanide metal or actinide metal.

9. The medium of claim 1, wherein the constituent metal atom is central metal atom.

10. The medium of claim 9, wherein the central metal atom is a transition metal.

11. The medium of claim 1, wherein the constituent metal atom is Ge, Sn, a transition metal, Al, Ga or In.

12. The medium of claim 1, wherein the polymer comprises imidazoline, pyridine or imidazole heterocyclic moieties.

13. The medium of claim 1, wherein the polymer comprises thiolate or carboxylate ionic moieties.

14. The medium of claim 1, wherein the medium comprises a thermally stable substrate.

15. A readable information medium comprising a relatively thick and thermally stable substrate and having coated thereon a layer comprising an information track comprised of a succession of spaced pits, said layer being comprised of a polymer and an organo macrocyclic chromophore containing a constituent metal atom, with the chromophore being chemically coordinated to the polymer through its constituent metal atom.

16. The medium of claim 15, wherein the polymer is a dimer acid polyamide.

17. The medium of claim 15, wherein the polymer is a poly(vinylpyridine).

18. The medium of claim 15, wherein the organo macrocyclic chromophore is an aza-annulene.

19. The medium of claim 15, wherein the medium is in the shape of a disk.

20. The medium of claim 15, wherein the constituent metal atom is Ge, Sn, a transition metal, Al, Ga, In, an alkaline earth metal, lanthanide metal or actinide metal.

21. The medium of claim 15, wherein the constituent metal atom is a central metal atom.

22. The medium of claim 21, wherein the central metal atom is a transition metal.

23. An erasable optical data medium comprising an information layer comprised of a polymer and an organo macrocyclic chromophore containing a constituent metal atom, with the chromophore being chemically coordinated to the polymer through the constituent metal atom.

24. The erasable optical data medium of claim 23, wherein the constituent metal atom is a centrol metal atom.

25. The erasable optical data medium of claim 23, wherein the medium is in the form of a disk.

26. In an optical recording medium for use with a recording laser providing light of a predetermined frequency, and comprising a layer for the recording of information through the formation of pits, the improvement which comprises said layer being comprised of a polymer and an organo macrocyclic chromophore containing a constituent metal atom, with the chromophore being chemically coordinated to the polymer through the constituent metal atom.

27. The optical recording medium of claim 26, wherein the constituent metal atom is a central metal atom.

28. A method of recording information in a thin film deposited on a relatively thick substrate by irradiating the film with a laser beam in accordance with said information to form pits in the film, the improvement which comprises said film being comprised of a polymer and an organo macrocyclic chromophore containing a constituent metal atom, with the chromophore being chemically coordinated to the polymer through the constituent metal atom.

29. The method of recording of claim 28, wherein the constituent metal atom is a central metal atom.

30. A method of erasing a deformation information pattern of an optical information medium, which deformation pattern is formed in a film deposited on a substrate and with said erasing being achieved by heating or imparting energy to said film, the improvement which comprises said film being comprised of a polymer and an organo macrocyclic chromophore containing a constituent metal atom, with the chromophore being chemically coordinated to the polymer through the constituent metal atom.

31. The method of erasing of claim 30, wherein the constituent metal atom is a central metal atom.

32. The medium in claim 1, wherein the chromophore is of the following formula:

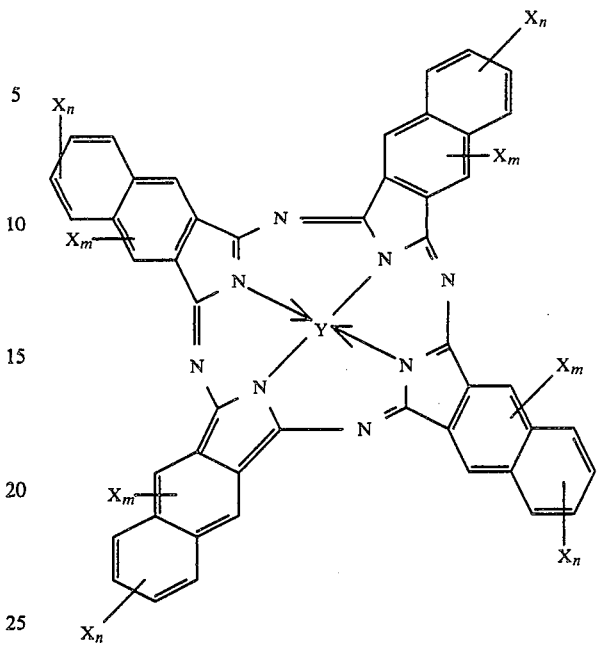

wherein the X substituents are independently selected organic or inorganic substituents and can be the same or different, with n and m indicating the number of independently selected X substituents, each n being the same or different and ranging from 0 to 4, and each m being the same or different and ranging from 0 to 2; and, Y is a Ge, Sn, transition metal, Al, Ga, In, alkaline earth metal, lanthanide metal or actinide metal atom.

33. The medium of claim 32, wherein Y is a transition metal.

* * * * *